March 26, 1968  M. V. BAZILLI ET AL  3,374,956
FERTILIZER SPREADER
Filed July 19, 1965  6 Sheets-Sheet 1

United States Patent Office 3,374,956
Patented Mar. 26, 1968

3,374,956
FERTILIZER SPREADER
Michael V. Bazilli, Oakville, and Stanley G. Siddall, Orangeville, Ontario, Canada, and William G. Moore and Jack C. Whitesides, Albany, Ga., assignors to Lilliston Implement Company, Albany, Ga., a corporation of Georgia
Filed July 19, 1965, Ser. No. 472,819
7 Claims. (Cl. 239—683)

ABSTRACT OF THE DISCLOSURE

A fertilizer spreader for transporting and spreading fertilizer over a selected area of the ground with accurate control over the volume of the material spread and the area on which it is spread, while the speed of the device over the ground can be varied from extremely low speeds to extremely high speeds. The spreader includes a wheel supported frame, a spinner rotatable about a vertical axis, apertured valve plates positioned above the spinner for admitting fertilizer to the spinner, a circular baffle rotatable with the spinner above the valve plates, and an impeller positioned between the baffle and valve plates and rotatable with the spinner.

BACKGROUND OF THE INVENTION

In spreading a fertilizer over a crop or field, the farmer is usually primarily interested in spreading the fertilizer as rapidly as possible while maintaining accurate control of the volume of fertilizer spread over a given area and the accuracy with which the fertilizer is directed over the given area. In the past, various devices have been contrived to speed up the operation of spreading fertilizer, which generally included a storage hopper in the shape of an inverted cone mounted above a mechanism that received the fertilizer from the apex of the cone and spread it over the ground. In utilizing these devices, the farmer has encountered problems involving an even distribution of the fertilizer and control over the volume of the fertilizer spread.

These problems vary somewhat with different types of fertilizers since some fertilizers are substantially granular or spherically shaped and flow relatively freely in the hopper as compared to a finer powdery fertilizer, the particles of which have high natural angles of repose which tend to cause the particles to pack together and form a bridge in the hopper.

In spreading the coarser granular fertilizer the weight of the fertilizer at the top of a full hopper is relatively easily transmitted down along the sides of the hopper to the bottom or apex thereof so that the granules flowing into the spreading mechanism at the bottom of the hopper feel the weight of the fertilizer above them. As the fertilizer is removed from the hopper by the spreading mechanism the weight exerted on the lowermost granules is reduced. Because of this phenomenon the flow characteristics of the fertilizer through the spreading mechanism continuously changes as the pressure of the fertilizer fed thereto changes and the operator must continuously adjust the spreader in order to uniformly spread the fertilizer over his crop.

In spreading the finer powdery fertilizer the particles are partially supported by the sides of the conical hopper, and since the particles tend to pack together, will bridge across the hopper until the spreader is vibrated or jostled by its movement over the ground or, in some cases, until a person reaches inside the hopper to destroy the bridge. This causes the fertilizer at the apex of the hopper to feel the weight of the fertilizer above it only intermittently. Because of this phenomenon the flow characteristics of the fertilizer through the spreading mechanism are sporadic and the operator must continually adjust the spreader in order to maintain uniform spreading actions.

In taking precautionary measures to insure that the fertilizer is spread evenly from the spreader, the operator of a spreader has usually been forced to operate his spreading apparatus at a substantially constant speed for a given volume of fertilizer present in the hopper of his apparatus. In other words, when the apparatus was full and the fertilizer was fully packed in the hopper, the operator would usually tow the spreading apparatus over the ground at a fairly constant rate of speed and gradually increase or decrease the speed thereof as the amount of fertilizer in the hopper diminished and the flow of fertilizer through the spreading apparatus changed. Thus, the particular flow characteristics of the fertilizer in the spreader determined the speed at which the device could be operated, which was often inconvenient to the operator since it is sometimes difficult to operate the apparatus at a high rate of speed over the contours of the land and inconvenient to operate the device slowly over the flat portions of the land which ordinarily would be conductive to high speed operation.

In order to accurately control the flow of fertilizer from the hopper to the spreading mechanism it is necessary to establish an area of substantially constant pressure of the fertilizer in the hopper immediately above the spreading mechanism. The constant pressure of the fertilizer being fed into the spreading mechanism insures that it will not be starved of the fertilizer, as when a powdery fertilizer bridges in the hopper, or be choked with the fertilizer, as when a granular fertilizer has substantially its full load weight resting on the spreading mechanism.

SUMMARY OF THE INVENTION

Since the reasons that the various forms of fertilizer do not feed well from the hopper to the spreader mechanism are different, it is apparent that the mechanical apparatus necessary to establish a constant pressure area as described above will vary according to the particular substance being spread. Accordingly, this disclosure sets forth two forms of the invention, one form which is best suited to spread granular fertilizer and another form which is best suited to spread a powdery fertilizer. Thus, it is to be understood that appended claims should not be limited to the particular embodiments disclosed but are intended to cover any structure utilized to create the particular desired pressures described.

This invention comprises a method and apparatus for storing and transporting fertilizer, feeding the fertilizer to an area of substantially constant pressure, moving the fertilizer through an opening of selectively variable dimensions and propelling the fertilizer in a predetermined direction out over a predetermined area of the ground.

Accordingly, it is an object of this invention to provide apparatus for uniformly spreading fertilizer over a selected area of ground with varying speeds of operation.

It is another object of this invention to provide apparatus for maintaining a substantially constant speed of feed of fertilizer from a hopper toward an impeller when the impeller is operating at a given velocity, without regard to the amount of fertilizer present in the hopper.

It is another object of this invention to provide apparatus for spreading material over the ground with accurate control over the quantity of material spread per unit of time, the size of the area over which the material is spread, and the particular direction from the apparatus in which the material is spread.

It is another object of this invention to provide a method for storing and transporting fertilizer, and spreading said fertilizer at a substantially constant rate over the ground.

Numerous other objects, features and advantages of the present invention will be apparent from consideration of the following specification, taken in conjunction with the accompanying drawings.

DISCLOSURE OF THE EMBODIMENTS

Referring now more particularly to the drawing, FIGS. 1-6 show a fertilizer spreader utilized to spread a relatively coarse granular fertilizer that has generally good flow characteristics whereby the fertilizer at the apex of the hopper feels the weight of the fertilizer above it, the spreader having a hopper 10 connected to a support frame 12. The support frame 12 is mounted on wheels 13 and has a draw bar 14 connected thereto for attachment to a tractor, or the like. The hopper 10 has a rectangular open upper portion 15 and a lower portion 16 in the shape of an inverted pyramid, having side walls 17, 18, 19 and 20. The sides 17–20 of the hopper 10 converge toward and are connected to a circular hopper base 22.

The support frame 12 comprises two vertically extending side pieces 24 on each side of the hopper 10 attached across the mid points of the sides 18 and 20. Support bars 25 are attached to the upper edges of the support frames 24 so that they support the lower portion 16 of the hopper 10 along the mid points of the sides 17 and 19. In this manner the support frames 24 and support bars 25 completely surround the hopper at its mid portion, so that it is securely held in an upright, substantially vertical position. At their lower portions the support frames have an axle 26 attached thereto so that the wheels 13 and their associated elements can be mounted thereon. The draw bar 14 is attached to the support frames at their lower portions remote from the axle 26. The support frames 24 each have one side 28 thereof cut in the shape of a "U" so that the operator can cause fertilizer to be spread from the spreading mechanism to either side of the spreader without interference from the rear edges of the frame.

Figure 1:
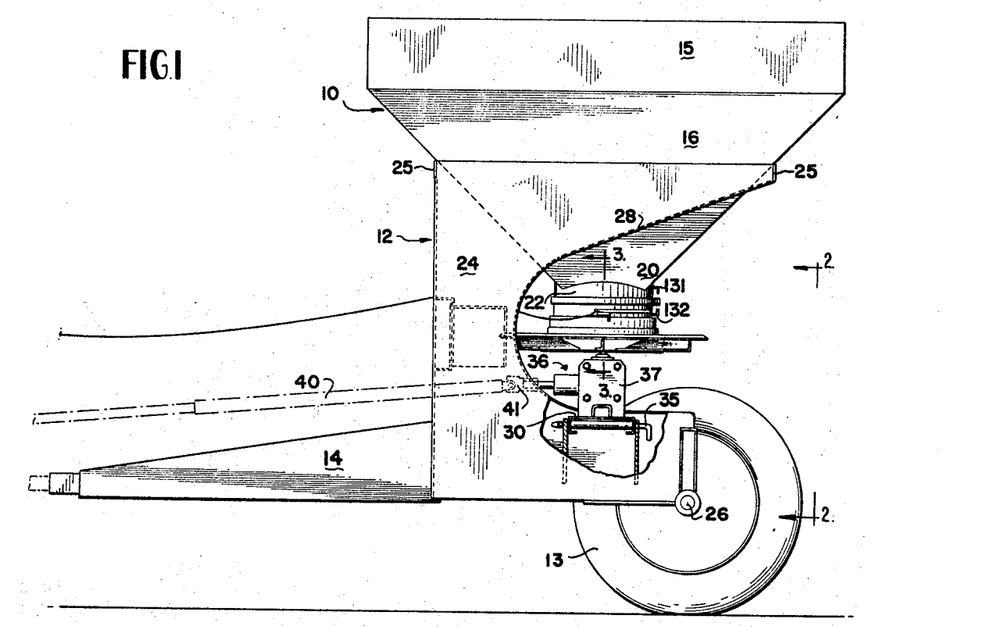
FIG. 1 is a side elevational view of the fertilizer spreader.
Figure 2:
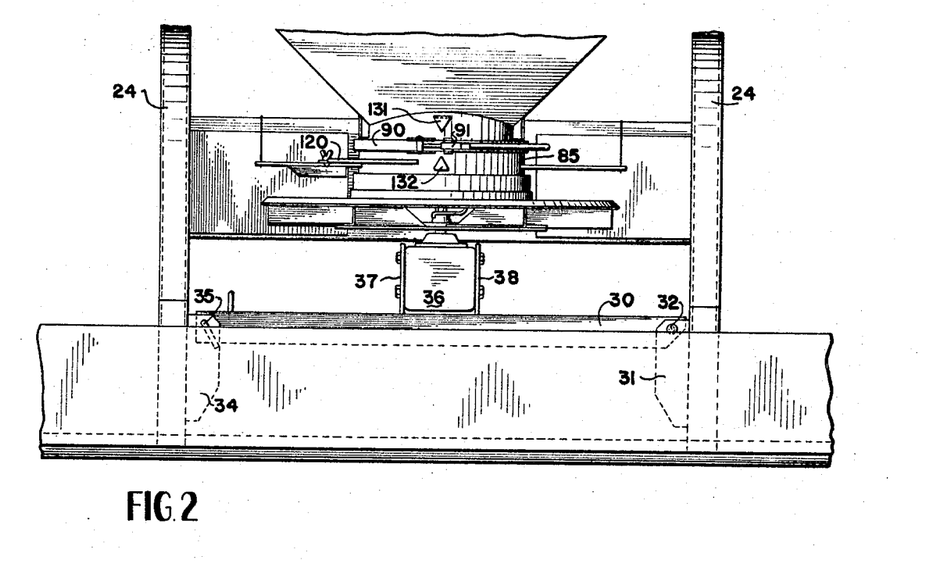
FIG. 2 is a partial end elevational view of the fertilizer spreader, taken along the lines 2—2 of FIG. 1.

As is best shown in FIG. 2, a support platform 30 extends between the lower portions of the support frames 24, and is pivotally attached to the tabs 31 at one end by the pin 32 and removably attached to the tabs 34 by the removable pin 35. A gear box 36 is mounted on the support platform 30 by way of the vertically extending support brackets 37 and 38. A drive shaft 40 which is adapted to be driven from a power take-off from a tractor, or the like, is connected to the gear box 36 by way of universal joint 41. A driven shaft 42 extends vertically from the gear box and has a tapered portion 43 over which a collar 44 is frictionally wedged. The collar 44 has an apertured flange 45 extending vertically of the driven shaft 42.

A spinner or impeller assembly 47 has its circular ejection base plate 48 connected to the flange 45 of the collar 44 with the bolts 49. The circular ejection base plate 48 has a plurality of spinner or impeller blades 50 welded thereon at equal angles around its circumference. The spinner blades 50 extend vertically of the ejection base plate 48 and have flanges 51 and 52 at their lower and upper portions, respectively, and extending in the direction of rotation of said assembly, and a tapered edge 53 extending from the upper flange 52 toward the lower flange 51 so that the blade 50 is longer at its lower portion than at its upper portion. A circular spinner dust shield 55 is mounted above the ejection base plate 48 and disposed substantially parallel thereto. The spinner blades 50 are welded at their flanged portions 51 and 52 to the ejection base plate 58 and the spinner dust shield 55, respectively. The spinner dust shield 55 has a peripheral flange 56 extending slightly beyond and over the outer edges of the spinner blades 50, and an inner vertical flange 57 disposed radially inwardly of the upper flange 52 of the spinner blades 50 and extending upwardly from the blades 50. A cylindrical spinner rim 58 is mounted within inner vertical flange 57 and attached thereto.

A shaft 60 is mounted vertically above the gear box 36 and its driven shaft 42. The shaft 60 is welded at its lower end to one leg of a U-shaped connector 61, and the connector 61 is bolted to the collar 44 by the locking nut 62. The U-shaped connector 61 has a tab 64 which is received in a cut-out portion 65 of the collar 44 so that when the locking nut is attached to the driven shaft 42 the U-shaped connector 61 will be securely connected to the collar 44 and the driven shaft 42.

A spiral impeller 67 is mounted concentrically on the shaft 60 and firmly connected thereto by the connecting pin 68. The spiral impeller 67 has a flat circular base 70, an inner flange 71 extending upward from the base 70, and an outer skirt 72 extending downward and outward from the base 70. The impeller 67 is formed with a conical spiral portion extending downward and outward from the inner flange 71 toward the outer skirt 72.

The shaft 60 is bored at 59 and a shaft extension 69 is inserted therein so as to extend the effective length of the shaft 60. The shaft extension 69 is firmly connected to the shaft 60 by the connecting pin 68.

Mounted on the shaft extension 69 above the spiral impeller 67 is a circular baffle or halo 75 having a flat portion 76 disposed in a plane perpendicular to the shaft 60 and having an annular flange 77 extending downward from the flat portion 76. The halo 75 defines an aperture 80 at its central portion in substantially the form of a figure 8. Support members 81 are attached to the underside of the halo 75 and extend inwardly of and downwardly from the halo where they are attached to the sleeve 82. The sleeve 82 is mounted on the shaft extension 69 and attached thereto by the pin 83. Thus, the halo 75 is supported on the shaft extension 69 by the sleeve 82 and the support member 81.

Mounted below the cylindrical hopper base 22 is a cylindrical valve box 85 which is co-extensive with the cylindrical hopper base 22. Both the cylindrical hopper base 22 and the cylindrical valve box 85 have rods 86 and 87, respectively, welded therearound near their points of joinder to form rim rings. An annular locking ring 90, of U-shaped cross section, is fitted over the rods or rim rings 86 and 87 around the cylindrical hopper base 22 and the cylindrical valve box 85 and locked therearound with the toggle latch of the turn buckle 91. In this manner, the cylindrical valve box 85 is attached to the cylindrical hopper base 22 and supported by the support frames 24.

An upper annular valve plate 95 is welded to the cylindrical valve box 85 at its outer periphery and is disposed generally perpendicularly to the shaft 60. A cylindrical valve sleeve 94 is welded to and supported by the inner annular periphery 93 of the upper valve plate 94. A lower annular valve plate 95, substantially identical to the upper valve plate 92, is positioned immediately below the upper valve plate 92 and a valve plate washer 96 is positioned immediately below the lower valve plate 95 at its inner annular periphery. The valve plate washer 96 is welded to the cylindrical valve sleeve 94 while the lower valve plate 95 is left free to rotate around the valve sleeve 94. The valve box 85 has slots 98 and 99 at the mid point of its side diametrically opposite from each other. A right valve handle 100 extends through the slot 98 and is attached to the lower valve plate 95, while a left valve handle 101 extends through the slot 99 and is attached to the other side of the lower valve plate 95. The left valve handle 101 is constructed with an elongate slot 102 therein and a depending flange 103 disposed substantially perpendicularly to the plane of the handle and parallel with the slot 102. The depending flange 103 is marked with a scale and a bolt is fitted through the slot 102 to support a pointer 105 which points down toward one of the numbers on the scale on the depending flange 103. The bolt can be loosened and the pointer moved along the slot to point at any number selected on the scale and the bolt can be tightened so that the pointer will remain pointed at the selected number.

The valve plates 92 and 95 define a series of apertures 110 and 111, respectively, circumferentially disposed throughout an arc of approximately 90 degrees. The apertures 110 and 111 are disposed so that they can be placed in matching relationship by rotating the lower valve plate 95 with respect to the upper valve plate 92. The lower valve plate 95 has a plurality of baffle plates 113 depending therefrom on each side of its apertures 111. Each of the baffle plates 113 has a flange at its upper portion which is welded to the lower valve plate 95, between the baffle plates 113 and the shaft 60.

Figure 5:
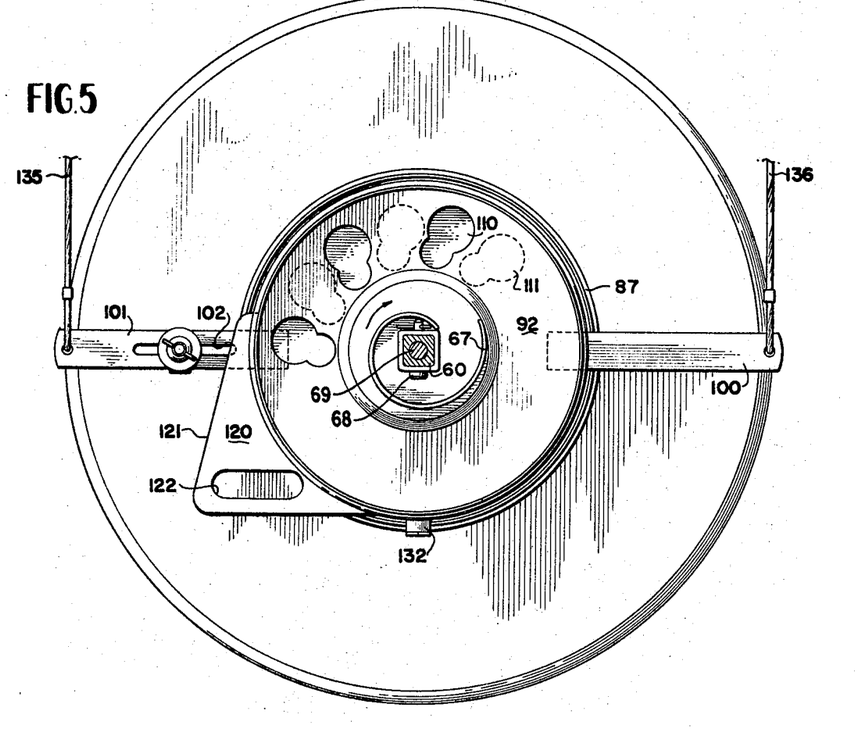
FIG. 5 is a partial plan view of the fertilizer spreader with the hopper removed and with the valve plates in their closed position.
Figure 5A:
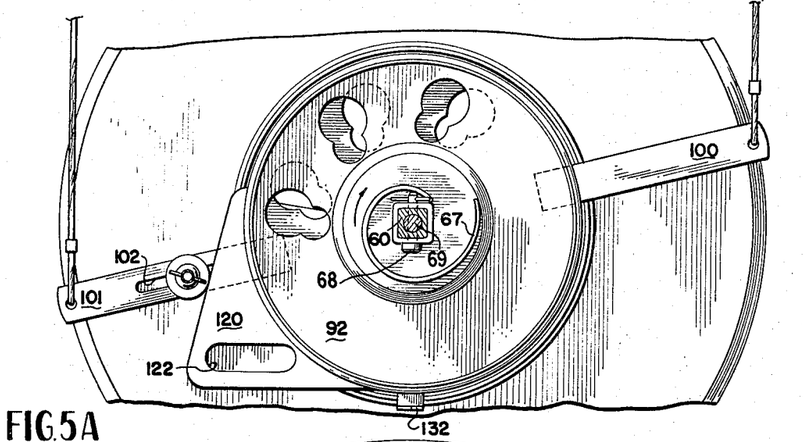
FIG. 5a is a plan view of the fertilizer spreader with the hopper removed, similar to FIG. 5, but with the valve plates in their partially opened position.

As is best shown in FIGS. 2 and 5, a pattern control handle 120 is attached to the valve box 85 below the cylindrical hopper base 22. The pattern control handle 120 has one edge 121 extending tangentially away from the cylindrical valve box 85, and the control handle defines an elongated aperture 122 therein.

Figures 7, 9:
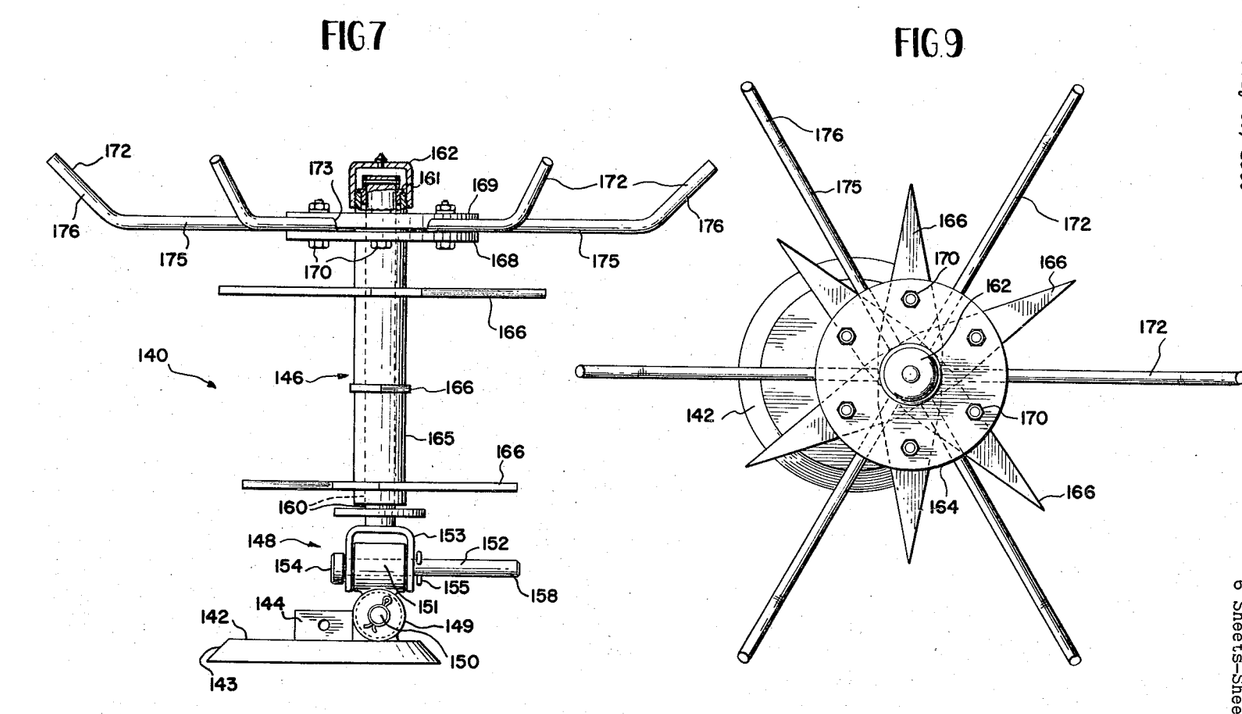
FIG. 7 shows a modified form of the invention and is an elevational view of an agitator to be utilized with the fertilizer spreader.
FIG. 9 is a plan view of the agitator, taken along lines 9—9 of FIG. 7.
Figure 8:
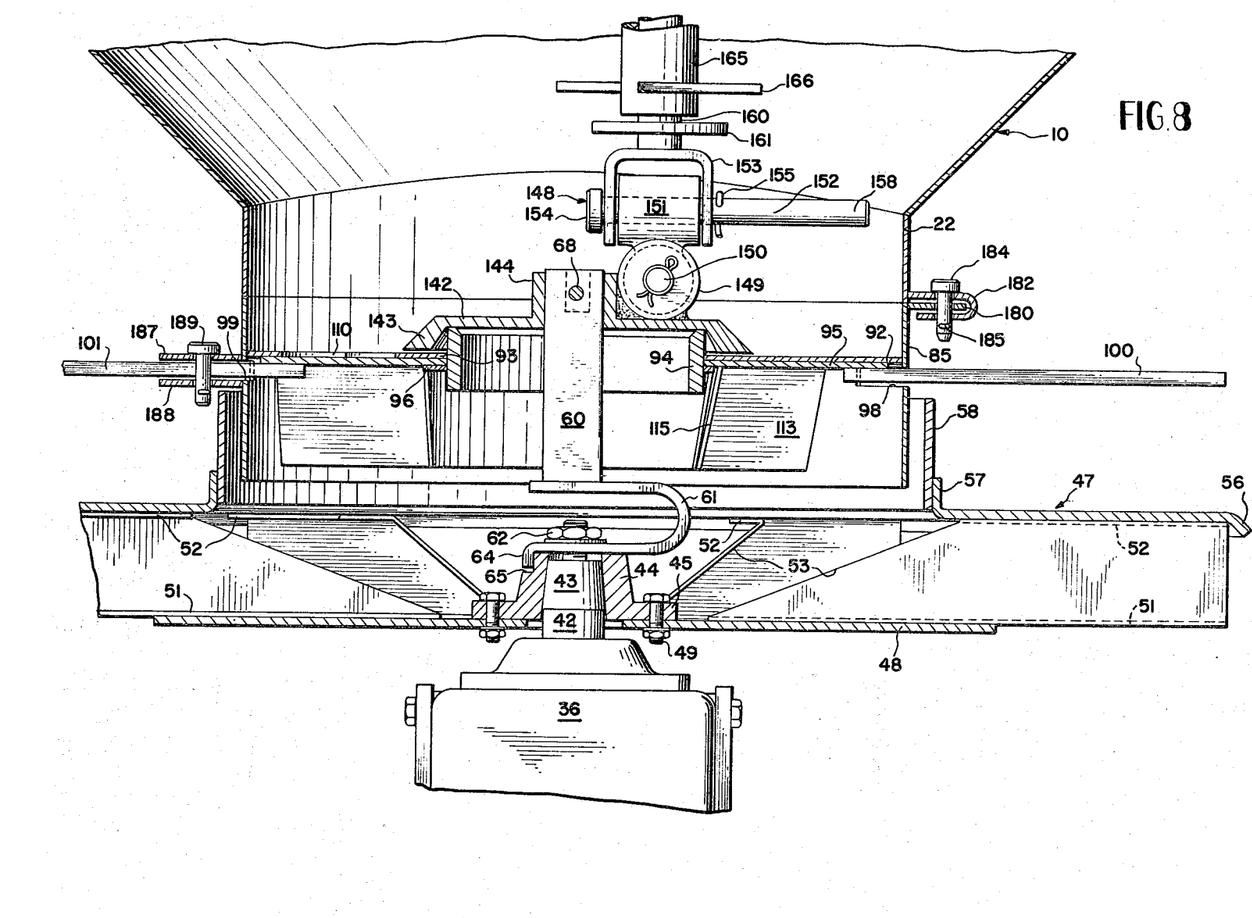
FIG. 8 is a partial cross-sectional view of the fertilizer spreader, substantially similar to FIG. 3, but showing the use of the agitator.

FIGS. 7–9 show a modified form of the invention which is primarily utilized to spread a relatively fine or powdery fertilizer that tends to periodically bridge across the hopper of the spreader and vary the pressure exerted on the spreading apparatus.

The hopper and spreading mechanism of this form of the invention are identical to that previously disclosed. The operator of the spreader merely removes the pin 68 that connects the spiral impeller 67 and shaft extension 69 to the shaft 60, and lifts off the halo 75, shaft extension 69, and the spiral impeller 67. The agitator assembly 140, as is best shown in FIG. 7, is substituted for the halo 75 and spiral impeller 67.

The agitator mechanism 140 comprises a base 142 having an outer annular skirt 143 extending outwardly and downwardly therefrom. The base 142 has an inner flange 144 which is constructed to fit around the shaft 60. The base 142 is fitted over shaft 60 and the pin 68 is inserted through an aperture defined by the flange 44, and through the shaft 60.

An agitator 146 is mounted on the base 142 of the agitator mechanism 140. The universal joint 148 is positioned between the agitator 146 and the base 142 so that the agitator 146 is free to pivot in any direction from the base 142. The universal joint 148 is of conventional construction and comprises a socket 149 rigidly connected to the base 142, a pin 150 received in the socket 149, a second socket hingedly attached to the pin 150, a second pin 152 extending through the socket 151, and a third socket 153 hingedly attached to the pin 152. The pin 152 has a cap 154 on one end to prevent it from sliding through the sockets 151 and 153. Cotter pins 155 are inserted through both ends of the pins 150 and through the pin 152, so that these pins are maintained in their proper position. The pin 152 has an extension 158 on its end remote from the cap 154 for a purpose that will be explained more fully hereinafter. A shaft 160 is supported on the socket 153 and a flange 161 is positioned along the shaft 160 next adjacent to the socket 153.

The agitator 146 is slidably inserted over the shaft 160 and an end cap 162 is threaded onto the shaft 160 at its end remote from the socket 153. The agitator is rotatably secured to the shaft 160 by the end cap 162 and the flange 161.

The agitator 146 comprises a cylindrical pipe section 165 having a series of broad spikes evenly spaced along its length, extending on both sides of said pipe, and randomly oriented therearound. A plate 168 is attached to the upper end of the pipe section 165. A clamping plate 169 is positioned coaxially of the plate 168, and both plates 168 and 169 have a plurality of apertures spaced circumferentially therearound and bolts 170 are inserted therethrough.

A plurality of spikes 172 are clamped between the clamping plate 169 and the plate 168 in grooved portions 173 of the clamping plate 169. The spikes 172 are equally spaced around the clamping plate 169 and extend generally radially of the pipe section 165. The inner portions 175 of the spikes 172 extend in a plane generally perpendicular to the pipe section 165 while the outer portions 176 are angled upwardly to conform to some extent with the surface of the walls of the hopper 10.

With this arrangement it can be seen that rotation of the shaft 60 causes the base 142 to rotate. Since the agitator 146 is mounted eccentrically of the base 142 and the shaft 60, the shaft 146 will be moved with an oscillatory motion. Since the agitator 146 is free to rotate about the shaft 160, and since the universal joint 148 between the base 142 and the shaft 160 allows the agitator 146 to freely pivot around its base, it can be seen that the rotation of the base 142 will impart an oscillatory motion to the lower portion of the agitator but this motion will not necessarily impart rotation to the agitator 146 as a whole, nor will it necessarily cause an oscillating movement of the upper portion of the agitator in the same plane as imparted to the lower portion of the agitator.

When the hopper 10 of the fertilizer spreader contains fertilizer, the spikes 172 and 166 will extend out into the mass of fertilizer so that the fertilizer itself will tend to determine the particular movements of the upper portion of the agitator 146.

Figure 3:
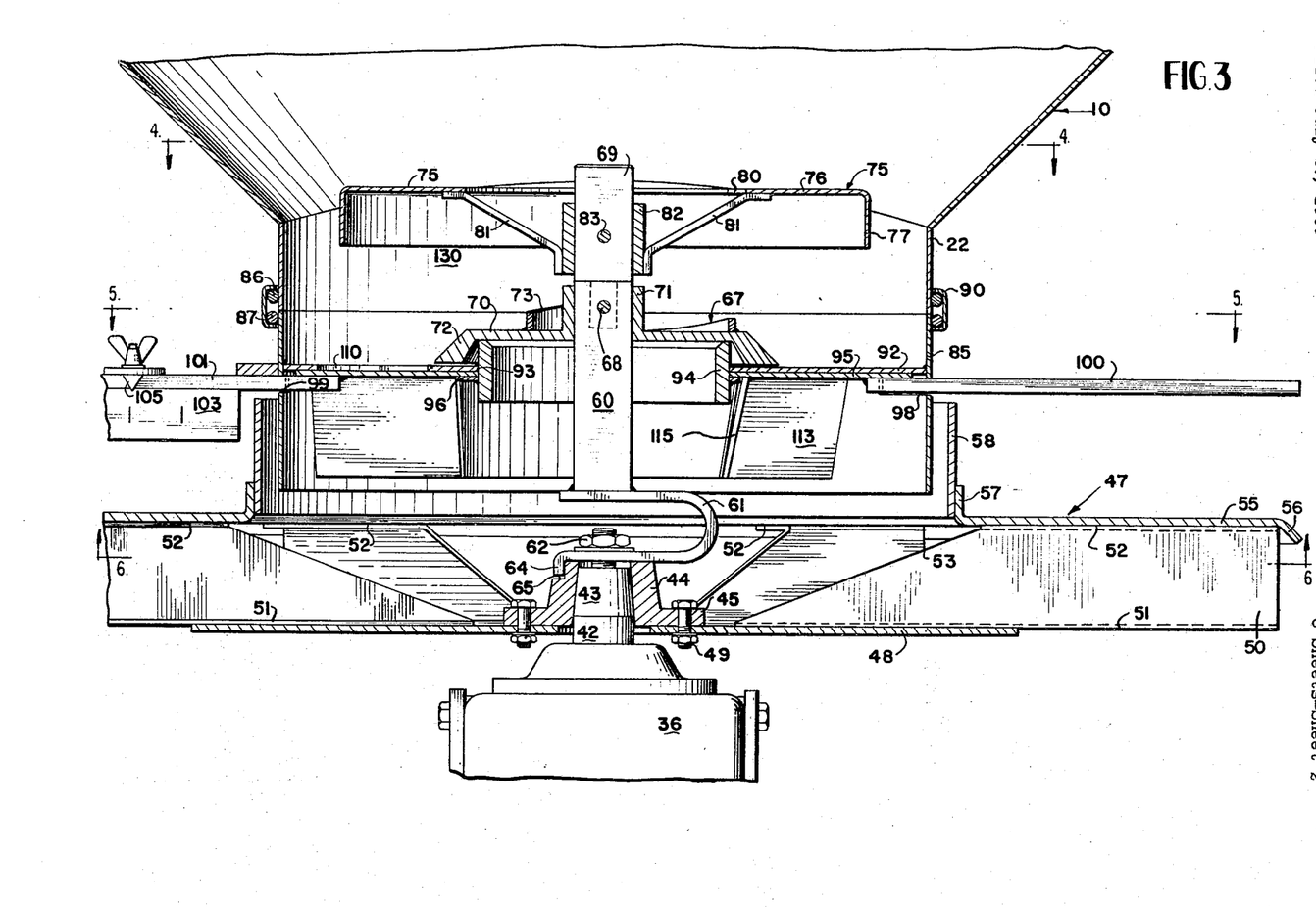
FIG. 3 is a partial cross-sectional view of the fertilizer spreader, taken along the lines 3—3 of FIG. 1.

As is best shown in FIG. 8, the hopper base 22 and the valve box 85 are connected to each other in a manner slightly different from that shown in FIG. 3. The valve box 85 has three tabs 180 near its upper portion extending generally laterally therefrom at equal points therearound. The tabs 180 extend from approximately 60 degrees to approximately 90 degrees around the outer portion of the valve box 85, and a plurality of holes are bored therethrough. The hopper base 22 has a plurality of U-shaped clamping means 182 similarly placed around its lower portion, with a plurality of holes bored through each side of the U. The valve box 85 and the hopper box 82 are assembled by positioning the valve box 85 and its associated elements next adjacent the hopper base 22 so that the tabs 180 are not in registration with the clamping means 182, and then rotating the valve box and its associated elements so that the tabs 180 slide in between the sides of the U of the U-shaped clamping means 182. When the lower portion of the fertilizer spreader is positioned at the desired angle, locking pins 184 are inserted through the apertures of the U-shaped clamping means 182 and the apertures of the tabs 180, and the retaining means, such as cotter pins 185, are inserted through the lower portion of the locking pins 184.

Control tabs 187 and 188, similar to the tab 180, are positioned on either side of the slot 99. The control tabs 187 and 188 have a plurality of holes bored therethrough and pins 189 are inserted therethrough and positioned on either side of the valve handle 101. The pins 189 are selectively insertable in any one of the holes of the control tabs 187 and 188 on either side of the valve handle 101 so that the movement of the valve handle in the slot 99, and the lower valve plate 95 can be selectively restricted.

OPERATION

When the operator desires to operate the fertilizer spreader, he fills the hopper 10 with the desired mixture of fertilizer, pulls the fertilizer spreader over the area on which he desires to spread fertilizer, and rotates the drive shaft 40 with the conventional power take off mechanism of his tractor. Rotation of the drive shaft 40 causes the driven shaft 42 to be rotated by the gear box 36, which driven shaft 42 in turn causes rotation of the spinner assembly 47 and rotation of the shaft 60. In the first described form of the invention which is primarily utilized for the coarser, granular relatively free flowing fertilizer, the shaft 60 is connected to the spiral impeller 67 and the halo 75 and these elements will be rotated in unison with the spinner assembly 47. During the operation of the device, the fertilizer will feed by gravity down from the hopper 10 through and around the halo 75 toward the valve chamber 130 formed by the halo 75, cylindrical hopper base 22, cylindrical valve box 85, and upper valve plate 92.

Figure 6:
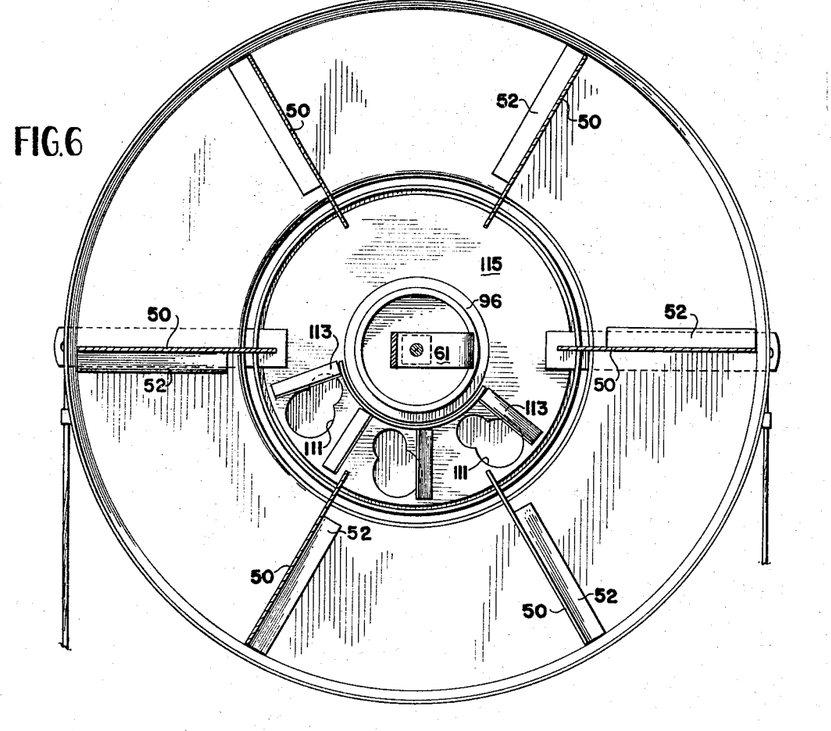
FIG. 6 is a cross-sectional view of the spinner and valve plate mechanism, taken along lines 6—6 of FIG. 3.

As the fertilizer feeds through the aperture 80 of the halo, it comes into contact with the spiral impeller 67 which is rotated in a clockwise direction as is shown in FIG. 6. Rotation of the spiral impeller in this manner causes the fertilizer flowing through the aperture 80 of the halo 75 to be impelled outwardly therefrom and over the apertures 110 and 111 of the upper and lower valve plates 92 and 95, respectively. As the fertilizer is thrust outwardly over the apertures 110 and 111, it continues to fall by force of gravity through the apertures 110 and 111 into the lower portion of the cylindrical valve box 85 and then downwardly into the spinner assembly 47. When the fertilizer is contacted by the spinner assembly 47, it is rapidly rotated and channeled by the blades 50 and their flanges 51 and 52 so that a centrifugal force is imparted thereto that causes it to be flung out toward the periphery of the spinner assembly 47. This causes the fertilizer to be thrown outwardly of the fertilizer spreader and over the area of the ground desired to be treated with fertilizer.

Since the apertures 110 and 111 are located in approximately a 90 degree arc of the valve plates 92 and 95, respectively, it can be seen that the fertilizer flowing through the device toward the spinner assembly 47 will be confined within this 90 degree arc so that the initial impact on the fertilizer by the spinner assembly will take place in a predetermined area. Since the velocity imparted to the fertilizer is substantially the same for each individual granule of fertilizer as it passes through the spinner assembly, the fertilizer will be projected in approximately a 90 degree arc from the spreader over the ground.

While the operator of the device can control the speed of the spinner assembly 47 by varying the speed of his power takeoff device which is attached to the drive shaft 40, the operator can maintain a limited amount of directional control of the spreading of the fertilizer by merely varying the speed of the spinner assembly 47. However, if the operator of the device desires to spread fertilizer over a particular area to the right of, or to the left of, or perhaps behind the fertilizer spreader, he can loosen the turn buckle assembly 91 so as to loosen the annular locking ring 90 to rotate the cylindrical valve box 85 toward the direction of the ground he desires to fertilize. After positioning the cylindrical valve box 85 in this manner, he can tighten the locking ring 90 by refastening the toggle latch of the turn buckle assembly 91. The pattern position pointers 131 and 132, as shown in FIG. 2, will indicate to the operator in which direction the fertilizer will be projected from the spreader. When the pointer 132 is positioned to one side of the pointer 131, the fertilizer will be projected generally in the direction from pointer 131 toward pointer 132, over an arc of approximately 90 degrees.

The operator of the spreader can vary the volume of flow through the spreader from his position on the tractor by merely pulling on the ropes 135 and 136 to pull the left valve handle 101 or the right valve handle 100, respectively, so as to rotate the lower valve plate 95 with respect to the upper valve plate 92 and align or misalign the apertures 110 and 111 as desired. Of course, when the apertures 110 and 111 are aligned the flow of fertilizer therethrough will be at a maximum, while partial mis-alignment of these apertures will decrease the flow of fertilizer, until the apertures are completely misaligned, whereupon no flow will take place.

If the operator of the spreader desires to set the apertures 110 and 111 so that a maximum opening can be attained which is less than the opening attainable when the openings are in full alignment, he can position the pointer 105 of the left valve handle 101 at a particular number on the scale of the depending flange 103 which will be indicative of the opening remaining between the apertures 110 and 111. Thus, when the operator pulls the rope 136 to its fullest extent the bolt of the pointer 105 will come to rest against the tangential edge 121 of the pattern control handle 120 which will prevent the apertures 110 and 111 from coming into full alignment. This allows the operator to manipulate the valve plate 95 so that the apertures 110 and 111 can be positioned from a full closed position to a predetermined maximum open position.

Figure 4:
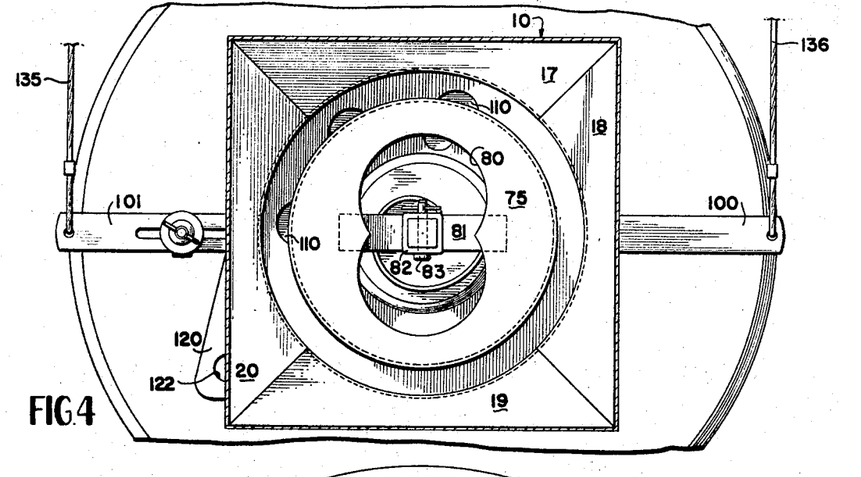
FIG. 4 is a plan view of the fertilizer spreader with a portion of the hopper broken away.

As is best shown in FIGS. 3 and 4, the annular flange 77 of the halo 75 is disposed directly above the apertures 110 and 111, and the aperture 80 in the halo 75 is mainly disposed inwardly of the apertures 110 and 111. The flat portion 76 and the annular flange 77 of the halo 75 are disposed generally at the apex of the hopper 10 so that fertilizer within the hopper 10 flows generally in the direction of the halo and is generally supported by the halo. As the spreader is operated, the fertilizer flows mainly through the aperture 80 since the spiral impeller 67 projects the fertilizer within the valve chamber 130 outwardly of the shaft 60, which has a tendency to cause a flow of fertilizer from the center toward the periphery of the upper valve plate 92.

Since the halo 75 helps support the fertilizer inside the hopper 10 it can be understood that the weight of the fertilizer above the halo is not fully imparted to the upper valve plate 92 when the spreader is operated, and the pressures within the mass of fertilizer within the chamber 130 are substantially independent of the weight of the fertilizer in the hopper 10 and tends to remain at a substantially constant pressure regardless of the manner in which the fertilizer shifts in and flows from the hopper during the operation of the spreader. Accordingly, the spiral impeller 67 moves the fertilizer outward over the apertures 110 and 111 at a substantially uniform rate for a given impeller speed, so that the fertilizer will fall through the apertures with substantially a constant rate of flow regardless of the amount of and disposition of the fertilizer remaining in the hopper 10. Also, the manner in which the fertilizer flows through the aperture 80 of the halo 75 and the manner in which the spiral impeller impels the fertilizer out over the apertures 110 and 111 insures that the fertilizer is maintained in the valve chamber in a pressure range that allows optimum speed of flow of the fertilizer through the apparatus. And the movement of the spiral impeller is such that it aids the movement of the fertilizer through the valve chamber so that it flows more rapidly therethrough than it normally would if only the forces of gravity were causing the flow, thus, increasing the total flow through the apparatus.

Furthermore, when a very small amount of fertilizer remains in the hopper 10, the flow of the fertilizer through the aperture 80 of the halo 75 will tend to slow slightly since there is less weight of fertilizer above the aperture 80. Thus, a slightly less amount of fertilizer will be fed to the spiral impeller 67 which would slow or vary the rate at which the fertilizer is projected over the apertures 110 and 111 by the spiral impeller. However, the fertilizer nearest the side wall 17-20 of the hopper 10 will tend to flow down to the valve chamber 130 around the periphery of the halo 75 and feed over and through the apertures 110 and 111. Accordingly, while the reduced volume of the fertilizer remaining in the partially filled hopper might cause a reduced rate of flow through the aperture 80 of the halo, the reduction in flow will be made up by an increased flow around the periphery of the halo, thereby maintaining a constant rate of flow through the apertures 110 and 111, and consequently from the periphery of the spinner assembly 47.

In the second described form of the invention which is primarily utilized for the finer powdery fertilizer which tends to pack together and form a bridge in the hopper, and which is not as free flowing as a course granular fertilizer, the base 142 is rotated by the shaft 60 so that the lower portion of the agitator mechanism 140 moves with an oscillatory motion. The universal joint 148 allows complete freedom of movement of the upper portion of the agitator 146 with respect to the base 142, and since the agitator 146 is free to rotate about its supporting shaft 160, the fertilizer in the lower portion of the hopper 10 will tend to limit the agitator 146 in its rotation around the shaft 160 and tend to center the upper portion of the agitator 146 in the hopper 10. Thus, the lower portion of the agitator 146 will constantly move around the apex of the hopper 10 so that the powdery fertilizer in the valve chamber 130 and the lower portion of the hopper 10 will be constantly churned by the broad spikes 166 and the pipe section 165. Also, the extension 158 of the pin 152 in the universal joint 148 is positioned so that it constantly radially projects outwardly of the universal joint 148 so that it sweeps around the valve chamber 130 on every revolution of the shaft 60. Accordingly, the fertilizer in the chamber 130 will be continuously churned by the extension 158 of the pin 152 so that no packing or caking of the fertilizer will be experienced in the chamber 130.

Because of the motion of the lower portion of the agitator 146 in the chamber 130 and at the apex of the hopper 10, a fairly constant pressure of the fertilizer in these areas will be maintained as the movement of the fertilizer in these areas will be maintained in a set pattern regardless of the presence or lack of fertilizer in the hopper 10. In other words, the fertilizer at the lower portion of the hopper and in the chamber 103 will have flow characteristics substantially independently of the fertilizer present in the hopper thereabove.

In order that the fertilizer in the hopper 10 above the apex of the hopper be prevented from packing or caking the spikes 172 are continuously moved by the upper portion of the pipe section 165 of the agitator 146. The movement of the spikes 172 is such that the end portions 176 are thrust into the mass of fertilizer in the hopper 10 so that any cakes of fertilizer will be broken up and separated and bridging of the fertilizer in the hopper 10 will be avoided. Since the outer portions 176 of the spikes 172 are generally coextensive with the wall of the hopper 10, they will tend to act on the fertilizer near the walls which is the area in which the fertilizer tends to bridge. Also, in the event that the upper portion of the agitator 146 is not centered in the hopper, the angled upper portion 176 of the spikes 172 will contact the walls of the hopper along the length of the outer portions 176 as opposed to the tip ends thereof. Obviously this prevents the spikes 172 from gouging the walls of the hopper.

As with the previous form of the invention the lower valve plate 95 can be adjustably positioned with respect to the upper valve plate 92 by movement of the valve handles 100 and 101. The control tabs 187 and 188 and their pins 189 limit the movement of the valve handles so that the operator, by placement of the pins 189, can select a maximum opening and minimum opening of the apertures 110 and 111.

Also, the lower portion of the spreader can be selectively positioned with respect to the hopper by merely removing the locking pin 184 from the clamping means 182 and the tabs 180 and rotating the lower portion to its desired position, and reinserting the locking pin 184. This provides the operator with the ability to direct the fertilizer propelled from the spreader in a particular direction.

While only two embodiments of the invention have been disclosed herein, it will be obvious to those skilled in the art that many variations may be made in the embodiments chosen for the purpose of illustrating the present invention without departing from the scope thereof as defined by the appended claims.

What is claimed as invention is:
1. Apparatus for spreading fertilizer comprising:
   (A) a vertical support frame;
   (B) a horizontal support platform supported by said support frame;
   (C) a gear box mounted on said support frame;
   (D) a drive shaft extending into one side of said gear box;
   (E) a driven shaft projecting upwardly from said gear box;
   (F) a spinner assembly connected to and disposed perpendicularly of said driven shaft;
   (G) a second shaft driven by and extending coaxially of said driven shaft;
   (H) a hopper connected to said support frame and positioned above said second shaft;
   (I) a cylindrical valve chamber positioned below said hopper;
      (1) upper and lower valve plates supported by said cylindrical valve chamber and movable with respect to each other,
         (a) said valve plates defining apertures therein arranged within an arc of approximately 90 degrees of said cylindrical chamber,
   (J) a baffle skirt attached to said lower valve plate and extending vertically between said second shaft and said apertures of said valve plates,
   (K) baffle plates attached to said lower valve plate and positioned between each of said apertures of said lower valve plate,
   (L) means connected to said second shaft for creating an area of substantially constant pressure immediately above said upper and lower valve plates.

2. Apparatus for spreading fertilizer as set forth in claim 1 wherein said means comprises an agitator eccentrically mounted on said second shaft and having a plurality of spikes extending therefrom.

3. Apparatus for spreading fertilizer as set forth in claim 1 wherein said means comprises an apertured rotatable circular baffle plate concentrically mounted on said second shaft.

4. Apparatus for spreading a granular substance as claimed in claim 1 wherein said upper valve plate apertures and said lower valve plate apertures are positionable with respect to each other whereby said lower valve plate apertures can be selectively aligned with said upper valve plate apertures.

5. Apparatus for spreading a granular substance as claimed in claim 1 wherein said cylindrical valve chamber is adjustable so that said cylindrical valve chamber and said valve plates are positionable to vary the location of the apertures of said upper and lower valve plates with respect to said hopper.

6. Apparatus for spreading a granular substance comprising:
   (A) a vertical support frame,
   (B) a horizontal support platform supported by said support frame,
   (C) a gear box mounted on said support platform,
   (D) a drive shaft extending into one side of said gear box,
   (E) a driven shaft projecting upwardly from said gear box,
   (F) a spinner assembly connected to and disposed perpendicularly to said driven shaft,
   (G) a second shaft driven by and extending coaxially of said driven shaft,
   (H) a spiral impeller disposed perpendicularly of and connected to said second shaft,
   (I) a circular baffle disposed perpendicularly of and connected to said second shaft above said spiral impeller and defining an aperture centrally thereof,
   (J) a hopper connected to said support frame and positioned above said circular baffle,
   (K) a cylindrical valve chamber extending below said hopper and surrounding said spiral impeller,
      (1) upper and lower valve plates supported by said cylindrical valve chamber and movable with respect to each other,
         (a) said valve plates defining apertures therein arranged within an arc of approximately 90 degrees of said cylindrical chamber,
         (b) a baffle skirt attached to said lower valve plate and extending vertically between said second shaft and said apertures of said valve plates,
         (c) baffle plates attached to said lower valve plate and positioned between each of said apertures of said lower valve plate,
whereby granular substance passes from said hopper through said aperture of said circular baffle, is contacted by said spiral impeller and projected over said valve plate apertures, falls through said valve plate apertures past said baffle skirt and said baffle plates toward a predetermined area of said spinner assembly.

7. Apparatus for spreading a granular substance comprising:
   a wheel supported frame,
   a gear box mounted on said frame,
   a drive shaft extending into one side of said gear box,
   a driven shaft projecting upwardly from said gear box,
   a spinner assembly connected to and disposed perpendicularly to said driven shaft,
   a second shaft driven by and extending coaxially of said driven shaft,
   an impeller connected to said second shaft,
   a circular baffle disposed perpendicularly of and connected to said second shaft above said impeller,
   a hopper connected to said support frame and positioned above said circular baffle and defining with said circular baffle an annular opening,
   a cylindrical valve chamber extending below said hopper and surrounding said impeller,
   upper and lower valve plates supported by said cylindrical valve chamber and movable with respect to each other, said valve plates defining apertures therein arranged within an arc of approximately 90 degrees of said cylindrical chamber,
   a baffle skirt attached to said lower valve plate and extending vertically between said second shaft and said apertures of said valve plates,
   battle plates attached to said lower valve plate and positioned between each of said apertures of said lower valve plate,
whereby granular substance passes from said hopper through said aperture of said circular baffle, is contacted by said impeller and projected over said valve plate apertures, falls through said valve plate apertures past said baffle skirt and said baffle plates towards a predetermined area of said spinner assembly.

References Cited
UNITED STATES PATENTS

| | | | |
|---|---|---|---|
| D. 198,327 | 6/1964 | Tyler. | |
| 350,821 | 10/1886 | Field | 275—15 |
| 892,745 | 7/1908 | Lanotte et al. | 222—239 X |
| 2,162,689 | 6/1939 | Mayfield | 275—8 |
| 2,843,274 | 7/1958 | Williams | 214—17.62 |
| 2,980,009 | 4/1961 | Donelson | 275—15 X |
| 3,064,833 | 11/1962 | Von Ruden | 275—15 X |
| 3,129,846 | 4/1964 | Vander Lely et al. | 275—15 X |
| 3,165,859 | 1/1965 | Waldrun | 275—15 X |

FOREIGN PATENTS 701,118   12/1953   Great Britain.

EVERETT W. KIRBY, *Primary Examiner.*

ABRAHAM G. STONE, *Examiner.*

J. R. OAKS, *Assistant Examiner.*